UNITED STATES PATENT OFFICE 2,552,388

METHOD OF KILLING WEEDS

Charles H. Allen, Jr., Slocum, R. I., assignor, by mesne assignments, to American Research Associates, Inc., a corporation of New Jersey No Drawing. Application April 22, 1947, Serial No. 743,200

4 Claims. (Cl. 71—2.3)

This invention relates to a method of selectively inhibiting certain weed plants without harming grass and other useful plants.

I have discovered a method of inhibiting weeds and particularly crabgrasses (*Digitaria sanguinalis* and other species of these grasses) by the employment of certain organo-mercuric salts. These toxicants are known to possess powerful bactericidal and fungicidal properties, but it has not been known heretofore that these compounds could be used as differential weed inhibitors or selective herbicides. The salts are preferably prepared in stable solutions. When these solutions are applied to a mixture of grass and other useful plants and weeds, the crabgrass plants are injured on contact of the solution but the other grasses and the like are not harmed.

Methods of preparing stabilized solutions and the solutions themselves are disclosed in considerable detail and claimed in the co-pending application of Paul Sartoretto, Serial No. 733,998, filed March 11, 1947, now abandoned. As disclosed in the Paul Sartoretto application, the solutions comprise an organomercuric salt, ammonia or water-soluble amine, and an acid. Of the amines, it has been found that the alkanolamines give very good results; however, where alkanolamines are used at least ⅓ molar weight of boric acid must be included for each hydroxyl radical equivalent of alkanolamine in the solution, otherwise the solution will be unstable towards reduction of the contained organomercurial. Among the organomercuric salts that may be used, phenylmercuric acetate is preferred because of its inexpensiveness and availability. Other organomercuric salts are good. In order that the phenylmercuric salt solution concentrates shall be stable towards precipitation of phenylmercuric hydroxide, tests have shown that it is necessary to maintain the pH within the range of 7 and 9.5. Excellent stability has been attained with the pH range between 7 and 8 and consequently this is the preferred range. A pH of 7.5 is ordinarily used.

The organo-mercurials act as selective phytotoxic agents against weeds, particularly crabgrasses (Digitaria spp.) to prevent germination and subsequent growth of the weeds. The eradicant or inhibitory action chiefly makes itself felt on the seed, germinating seed or young seedling stages of growth.

The following examples illustrate the invention. The examples are all limited to phenylmercuric salts, but other organomercuric salts of the general formula RHgX, where R is an organo group containing an aryl radical and X is the anion, could be used.

*Example I.*—100 grams of phenylmercuric acetate was added to a solution of 300 grams of water and 100 grams of an ethanolamine-boric acid mixture. The ethanolamine and boric acid mixture was prepared by warming 1 mol of boric acid with 3 mols. monoethanolamine until the boric acid completely dissolved. After five minutes of vigorous stirring, acetic acid was added to adjust the pH of the solution to about 7.5. The mixture was stirred for a half hour during which additional water was added to adjust the concentration of the phenylmercuric acetate to about 10% by weight. The amount of the new material used for weed killing is preferably one part of the 10% solution per 1800 parts of water. This water solution when sprayed on turf comprised of velvet, colonial, or creeping bent grasses contaminated with crabgrass seed was found to prevent the crabgrasses from developing without harming the bent grass.

*Example II.*—An alternate method is to add monoethanolamine and boric acid in the ratio given in Example I directly but separately to the amount of water given in Example I. Then the phenylmercuric acetate is added after the boric acid has been completely dissolved.

*Example III.*—A solution containing 6% by weight of phenylmercuric triethanolammonium lactate was also found to be a selective weed killer when used in a concentration of one part of the solution per 780 parts of water.

Although the solutions disclosed herein are useful herbicides, they are particularly effective against crabgrasses (Digitaria spp.) as demonstrated by the following actual field test data:

| (Solution per) Type of Herbicide | Dosage | Estimated Per Cent Crabgrass (Average of 5 replicates) | |
| --- | --- | --- | --- |
| | | Creeping Bent | Colonial Bent |
| Example I | 21 ml./10 gal | 0.0 | .25 |
| Example III | 48 ml./10 gal | .25 | 1.4 |
| Control | | 4.6 | 4.2 |

In using the solutions about 10 gallons are used per 1000 sq. ft. of surface, and it may be applied at intervals of 5 to 30 days for three months.

Eradication of crabgrasses by a single application of the solution described in Example I may be accomplished without injury to velvet bent or Chewing's fescue grass by using one part of solution to 200 parts of water.

In this specification and claims the term "inhibiting weeds" is intended to include killing weeds as the materials herein described are effective for not only inhibiting the growth of weeds but also killing the weeds after they have started their growth.

Having described my invention as related to the embodiments set out in the accompanying examples, it is my intention that the invention be not limited by any of the details of description unless otherwise specified but rather be construed broadly within its spirit and scope as set out in the accompanying claims.

I claim:

1. The method of killing weeds in an active state of growth which comprises applying to the weeds a composition comprising phenylmercuric acetate, water, an alkanolamine and boric acid, said boric acid being present in a ratio of at least one-third molar weight of the acid to each hydroxyl equivalent weight of the amine, said solution having a pH of between 7.0 and 9.5, and said solution being in a concentration of about one parts of phenylmercuric compound per 1,000 to 80,000 parts of water and being applied to the surface to be treated at the rate of about 10 gallons per 1,000 square feet at intervals of 5 to 30 days for about three months.

2. The method of destroying crabgrasses which comprises applying to plants including crabgrasses a composition comprising a carrier and phenylmercuric acetate, the phenylmercuric acetate being present in a concentration and amount sufficient to destroy crabgrasses but insufficient to destroy material quantities of the useful grasses and plants.

3. The method of destroying crabgrasses which comprises applying to plants including crabgrasses a composition comprising a carrier and at least one phenylmercury compound which, on solution in water, will yield phenylmercuric acetate in a significant amount, the phenylmercury compound being present in a concentration and amount sufficient to destroy crabgrasses but insufficient to destroy material quantities of the useful grasses and plants.

4. The method of claim 3 wherein the phenylmercury compound is present in an amount of about one part to about 1,000 to 80,000 parts of the carrier.

CHARLES H. ALLEN, Jr.

REFERENCES CITED

The following references are of record in the file of this patent:

UNITED STATES PATENTS

| Number | Name | Date |
|---|---|---|
| 1,640,901 | Lieske et al. | Aug. 30, 1927 |
| 2,062,823 | Ralston | Dec. 1, 1936 |
| 2,183,493 | Rentschler | Dec. 12, 1939 |
| 2,209,905 | Ralston | July 30, 1940 |
| 2,284,067 | Ralston et al. | May 26, 1942 |
| 2,422,951 | Conant | June 24, 1947 |
| 2,436,184 | Stillman | Feb. 17, 1948 |

FOREIGN PATENTS

| Number | Country | Date |
|---|---|---|
| 10,450 | Great Britain | of 1905 |

OTHER REFERENCES

The Greenskeepers' Reporter, Nov.–Dec. 1944, pages 5 and 6.